July 12, 1927. 1,635,494
J. MOREAU
BEET HARVESTER
Filed June 6, 1924 3 Sheets-Sheet 1
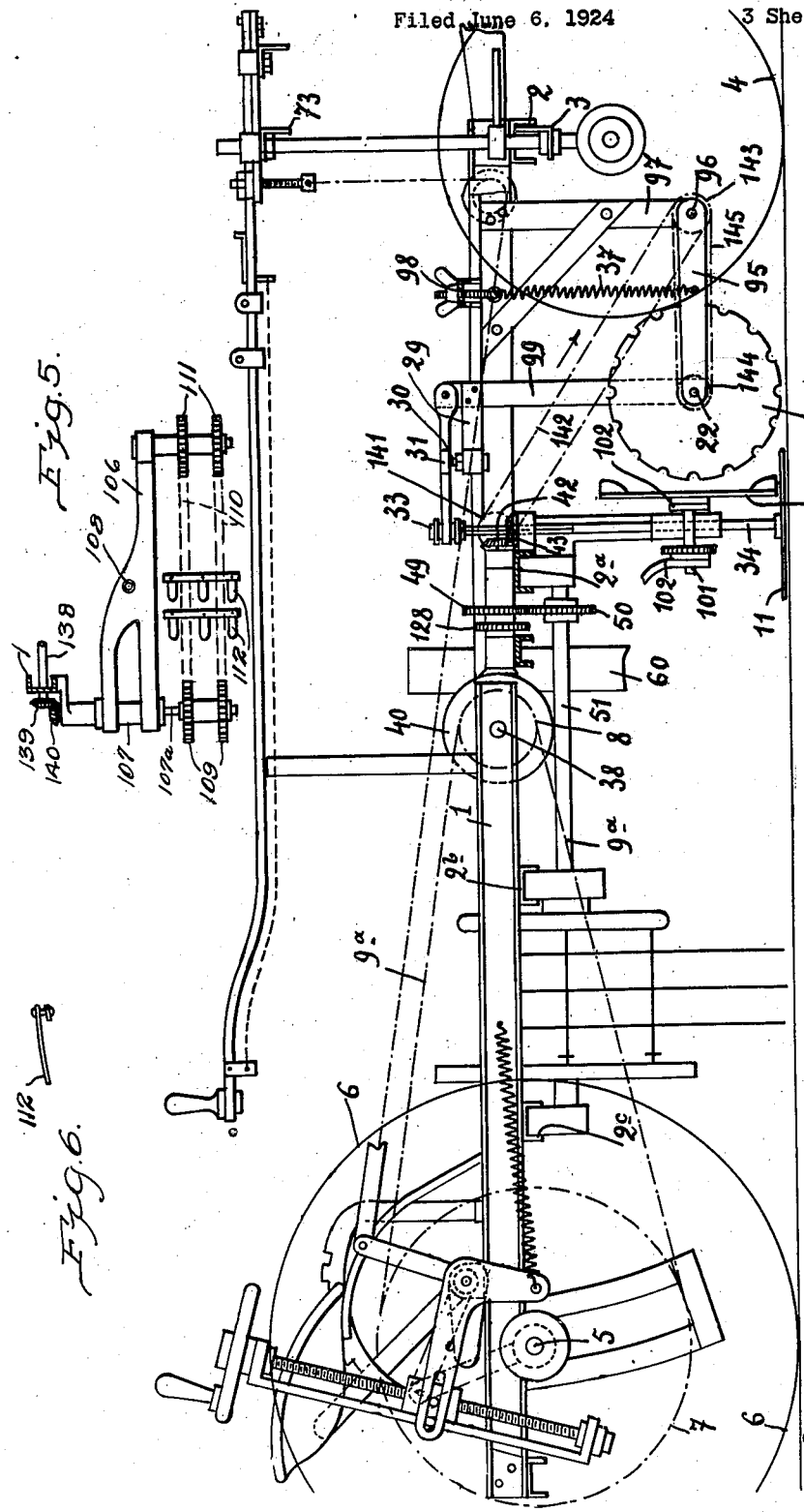
Inventor
Jean Moreau
By
Atty.

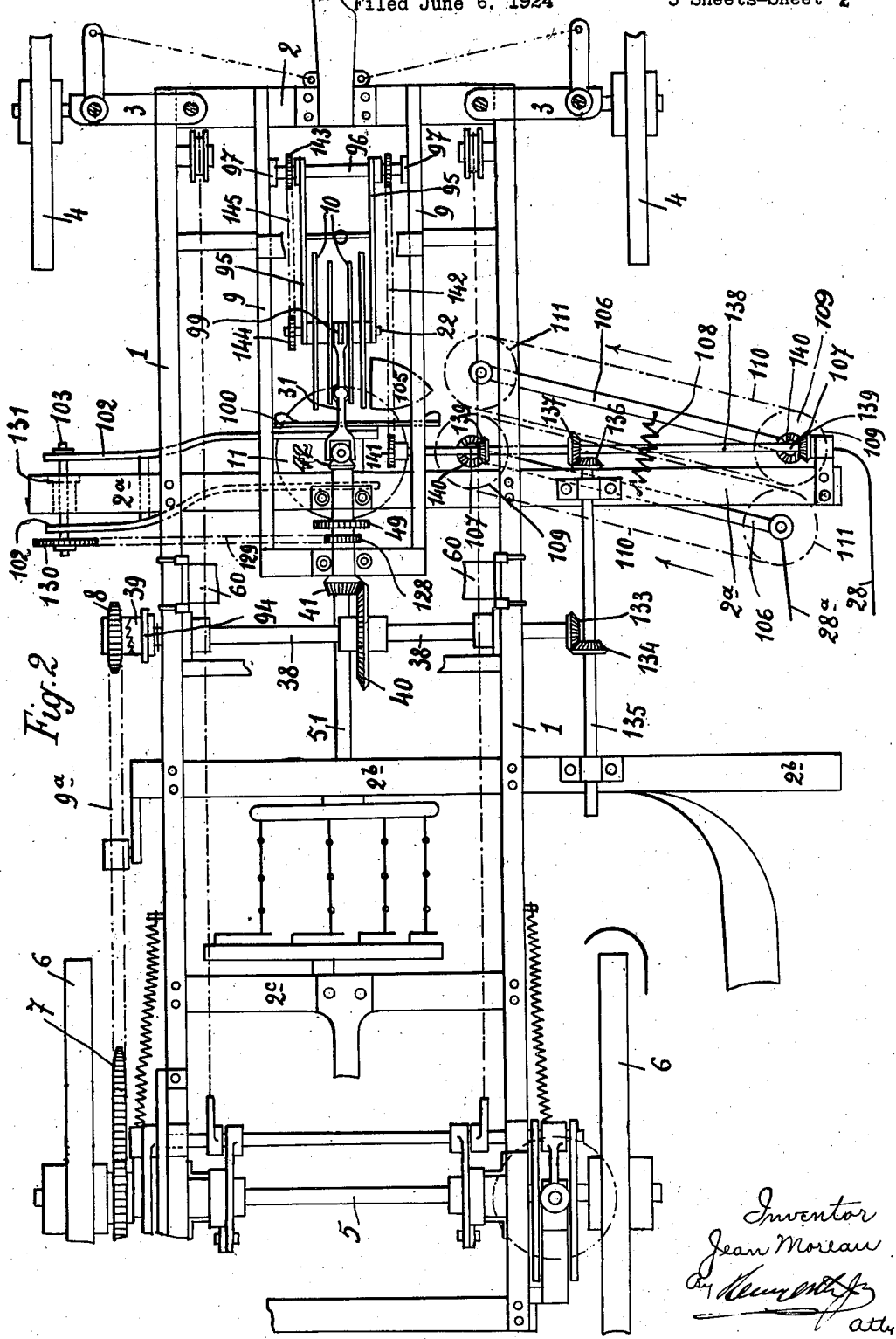

July 12, 1927.

J. MOREAU 1,635,494

BEET HARVESTER

Filed June 6, 1924

Patented July 12, 1927.

1,635,494

UNITED STATES PATENT OFFICE.

JEAN MOREAU, OF NOYELLES-SUR-ESCAUT-NORD, FRANCE.

BEET HARVESTER.

Application filed June 6, 1924, Serial No. 718,299, and in France June 13, 1923.

This invention relates to a machine for removing the tops of beetroots in which all the beetroots have the tops removed at a uniform height, however high they project above the surface of the ground, and in which the tops together with their leaves are thrown out at the side of the machine, along the same line.

The machine in question comprises metallic discs for regulating the cutting mounted upon an axle which is rotated. The rising of these discs over the heads of the beetroots projecting above the ground is transmitted to a like extent to a horizontal circular rotary knife adapted to cut off the tops at a constant height determined by the rising movement of the discs. Behind the regulating discs and perpendicular thereto, is a rotary disc provided with vanes for feeding the leaves between the parts of a horizontal conveyor, which deposits them on the ground outside the machine.

The machine is shown upon the accompanying drawings in which:—

Fig. 1 is a side elevation of the entire machine.

Fig. 2 is a plan thereof.

Fig. 5 is a front elevation of a pivotal support for the conveyor for the leaves.

Fig. 6 shows a detail of Fig. 5.

Figure 4:
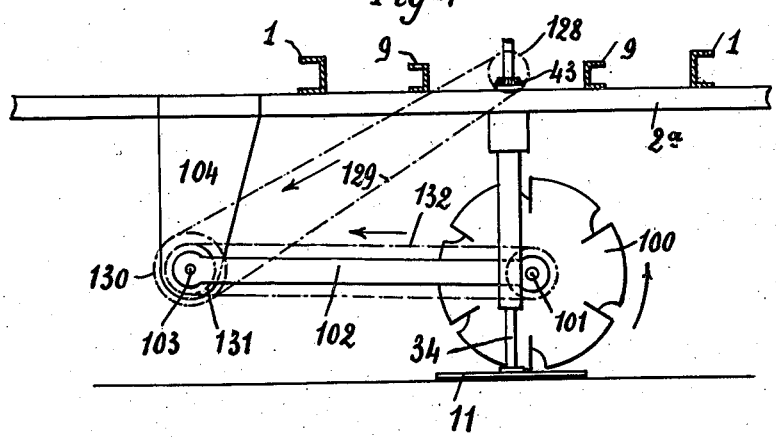
Fig. 4 is a rear view of the disc provided with vanes for feeding the leaves into the conveyor.

The machine comprises a chassis or main frame work having two side members 1, suitably interconnected by cross pieces 2, 2ª, 2ᵇ, 2ᶜ. The side members rest at the front on a transverse member 3 which constitutes the lower portion of a fixed frame carrying the two steering wheels 4, 4. The chassis is supported at the back by the axle 5, kept in rotation by two wheels 6. This axle carries a toothed wheel 7 which transmits movement to a pinion 8 by means of a chain 9ª

On the cross pieces 2 and 2ª is mounted a small horizontal frame work 9 in which are carried the regulating discs 10 for the cutting, the circular rotary knife 11 and the disc 100 provided with vanes. The discs 10 are of any suitable number and suitably spaced apart. They turn with their shaft 22 with a circumferential velocity slightly greater than that of the wheels of the machine.

The chassis or frame work carrying the regulating discs comprises two arms 95 pivoted at 96 on two arms or brackets 97 fixed to the side members of the small chassis or frame 9.

Figure 3:
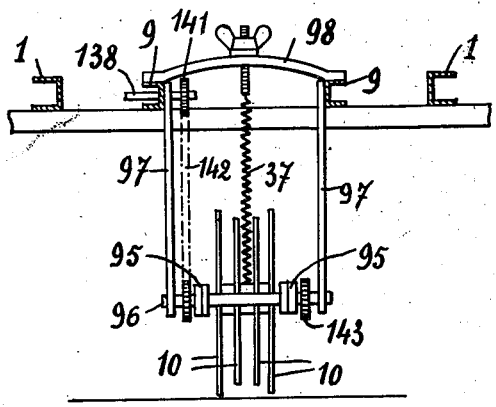
Fig. 3 is a front elevation of the support for the regulating discs.
Figure 7:
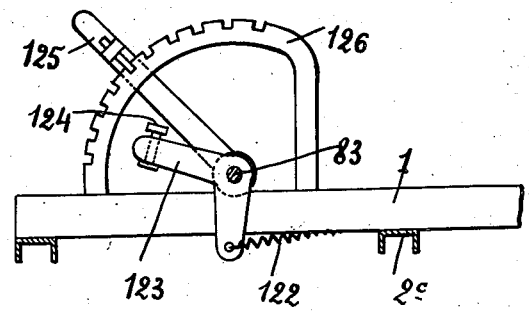
Fig. 7 shows a portion of the raising device.

The regulating discs 10, mounted on the axle 22, are provided with teeth as shown at Fig. 1, so that they can rise more easily over the heads of the beetroots, and the whole frame is carried resiliently from the upper cross piece 98 of the frame 9 (Figs. 1 and 3) by a spring 37 which can be regulated, enabling the pressure exerted on the heads of the beetroots by the discs 10 to be regulated.

On the shaft 22 of the discs is mounted a connecting rod or link 99 to which is fixed the arm 29 with an adjusting screw 30. On the stem of this screw there rests a long forked arm 31 pivotally mounted at the top of the link 99. At the other extremity it engages the piece 33 with which the upper portion of the vertical shaft of the rotary circular knife 11 is in engagement. This is movable vertically with the regulating discs. The movement of the discs and of the knife will be described hereafter when the general operation of all the parts is being considered.

The piece 33 does not interfere with the rotary motion of the shaft 34, but nevertheless enables this shaft to be raised together with the discs and through the same distance as these latter when they rise over the head of a beetroot. In order to effect this the shaft 34 can slide vertically through its support.

In the space between the discs 10 and the forward portion of the vertical shaft 34 of the knife 11 is located a vertical disc 100 provided with small vanes. The spindle 101 of this disc is at the side of the axis of the machine. It follows all the movements of rising and falling of the knife 11.

This disc, each vane on which has a recess in front of it, is intended to deliver the leaves beyond the discs after the tops have been removed from the beetroots. It is mounted on a spindle 101 (Figs. 1, 2 and 4) which is itself carried by two arms 102 pivotally mounted on a spindle 103 mounted in suitable supports 104 fixed to the cross member 2ª.

At the angle formed by the plane of the regulating disc 10 and the plane of the disc 100 with vanes is provided a curved plate 105 so arranged as to prevent the leaves turning around the disc with vanes and for directing them towards the opening of the conveyor for the leaves.

The conveyor for the leaves comprises two sets of chains mounted on the arms 106, 106 pivotally connected respectively in opposite directions at 107, 107 on supports one of which may be fixed to the side member 1 and the other to the cross member 2ª.

This arrangement permits the spacing apart of the two devices according to the thickness of the leaves being conveyed. The bringing together of the devices is effected in a springy manner by means of a spring 108 connecting them together, see Fig. 2.

On the shaft 107ª of each element is fixed a double toothed pinion 109 (Fig. 5) connected by two chains 110 to a double pinion 111 placed at the other extremity of the element. The two parallel chains are connected together by devices 112 formed with bent forks, constituting forked vanes and adapted to hold the leaves during their transport to the outside of the machine.

The movement is transmitted to two shafts 107 as will be explained hereafter and the whole arrangement of the two coupled devices constitutes the conveyor for the leaves. The outlet is provided with plates 28, 28ª so placed that they prevent the said leaves following the chains in case they should be entangled, and forming a conduit by which they are compelled to leave the machine and to fall upon the ground.

The principal operation of the machine is effected by the wheel 7, the chain 9ª and the pinion 8 operating the transverse shaft 38. The unclutching at 39 is effected from the chain pinion 8 by means of a guide lever which operates the raising of the front. A spring placed on the shaft between the movable sleeve and the channel or U shaped iron of the side frame brings back the clutch into the position of engagement.

The large pinion 40 fixed to the shaft 38, is in engagement with the pinion 41 at the extremity of which is keyed the bevel pinion 42 operating the shaft of the rotary knife 11 through the intervention of the pinion 43. On the shaft of the pinion 41 is keyed the toothed wheel 49 which by the wheel 50 controls the shaft 51 of the device, as well as another wheel 128 operating through a chain 129 the wheel 130 keyed on the shaft 103, the supports of which are fixed on the cross piece 2ª. This latter shaft carries on the other hand a toothed wheel 131 which operates through a chain 132 the shaft 101 of the disc 100 with vanes, see Fig. 4.

The principal shaft 38 is extended outside the machine, to operate through pinions 133, 134 a secondary shaft 135 itself operating through pinions 136, 137 another transverse shaft 138 giving movement to the conveyor for the leaves as well as to the regulating discs for the cutting.

The transverse shaft 138 carries pinions 139, 139 which operate through the pinions 140, 140, the shafts 107ª of the conveyor for leaves. This shaft also carries a toothed pinion 141 which, through a chain 142 transmits movement to the shaft 96, which controls in turn the shaft 22 of the regulating disc 10 for the cutting, by the wheels 143 and 144 and the chain 145.

I claim:

1. In a beet harvester, means to travel over the beets, a rotary knife lifted by said means to the crown of the beet, rotating means to remove the cut tops from the knife, a conveyor, and a guide between the conveyor and said rotating means to direct the tops to the conveyor from said rotating means.

2. In a beet harvester, a plurality of vertically disposed discs, a vertically swinging frame in which said discs are mounted, a vertical shaft having a cutter disc thereon, means on the frame to raise and lower said cutter in accordance with the movement of said discs, a vertical, rotary discharge disc cooperating with said cutter, a conveyor and a guide between the conveyor and cutter over which the discharge disc transfers the beet tops to said conveyor.

3. In a beet harvester, a substantially horizontally disposed cutter, a pair of cooperating endless beet top carriers receiving the beet tops from said cutter and discharging them at the side of the machine, and spring means to yieldingly hold the endless carriers in cooperating relation.

4. In a beet harvester, a transverse main driving shaft, a longitudinal auxiliary shaft, a rotary vertically movable cutter driven from said longitudinal shaft, a pivoted frame, a plurality of vertically disposed discs in said frame, means operated by the frame to raise and lower said cutter, a pair of cooperating endless conveyors, means to deliver the severed beet tops between the conveyors, means to urge the conveyors together, driving means for driving the conveyors from said main shaft, and means for rotating said vertically disposed discs from the carrier driving means.

5. In a beet harvester, a transverse main shaft, a longitudinal shaft driven thereby, a horizontally disposed rotary cutter actuated from the latter shaft and capable of vertical movement, a pivoted frame, a plurality of driven vertical discs mounted in said frame, means connecting the frame and cutter to vertically move the cutter, a shaft parallel to said longitudinal shaft, a pair of cooperating endless beet top carriers operated from said parallel shaft, a rotating beet top delivering disc cooperating with said cutter and vertically movable therewith and delivering the tops between said carriers, and a stationary guide between the cutter and its delivering disc and said endless carriers, to direct the tops between the carriers.

In testimony that I claim the foregoing as my invention, I have signed my name.

JEAN MOREAU.